June 4, 1929.  F. L. CONE  1,716,303
TOOL STOP FOR AUTOMATIC SCREW MACHINES
Filed Oct. 9, 1926   2 Sheets-Sheet 1
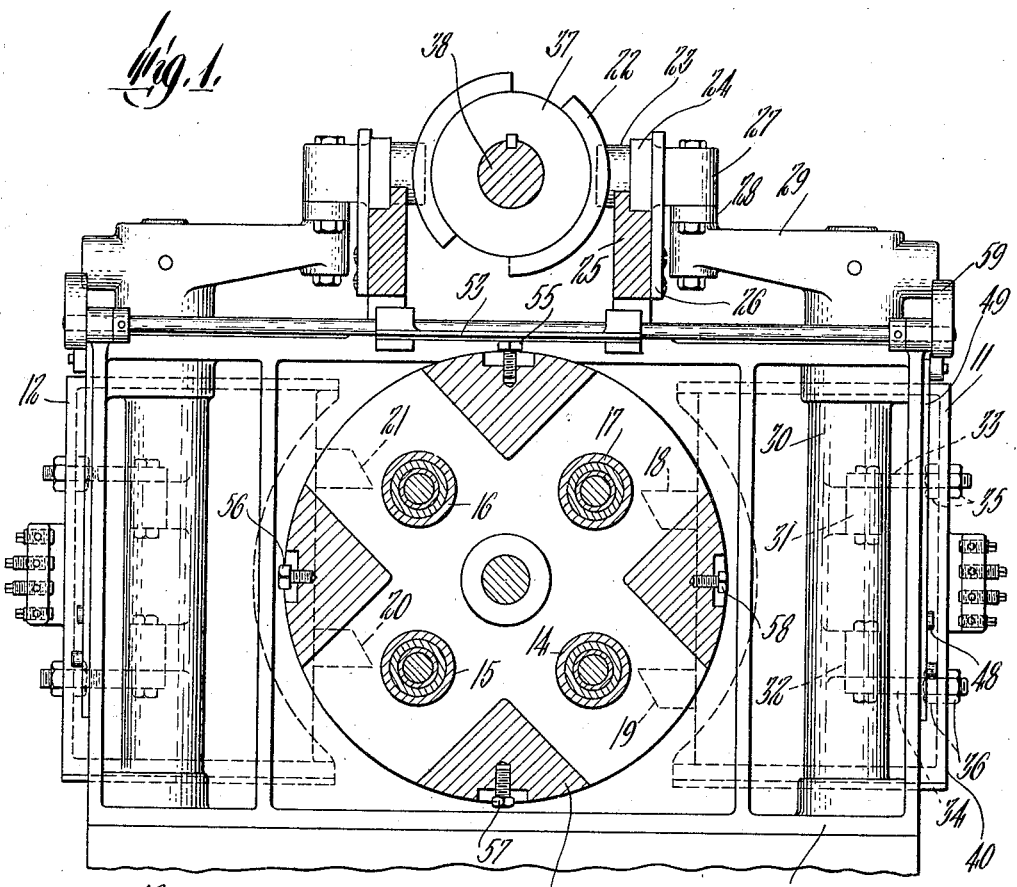
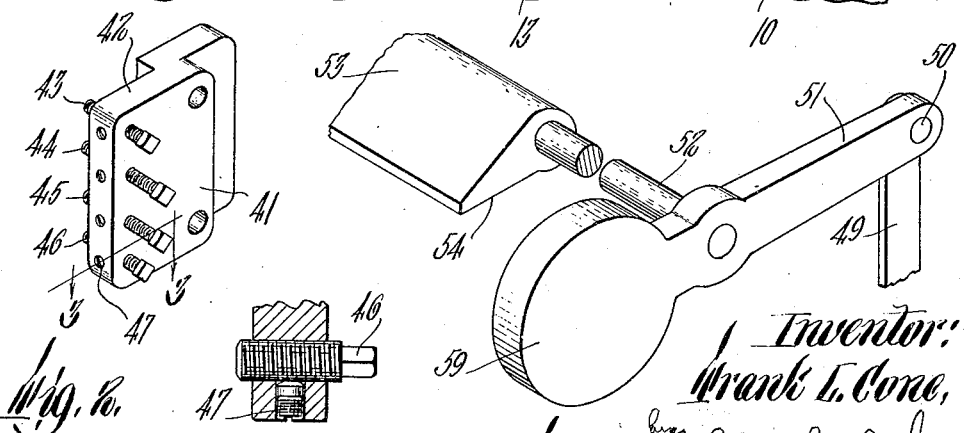
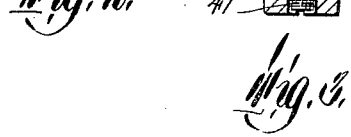

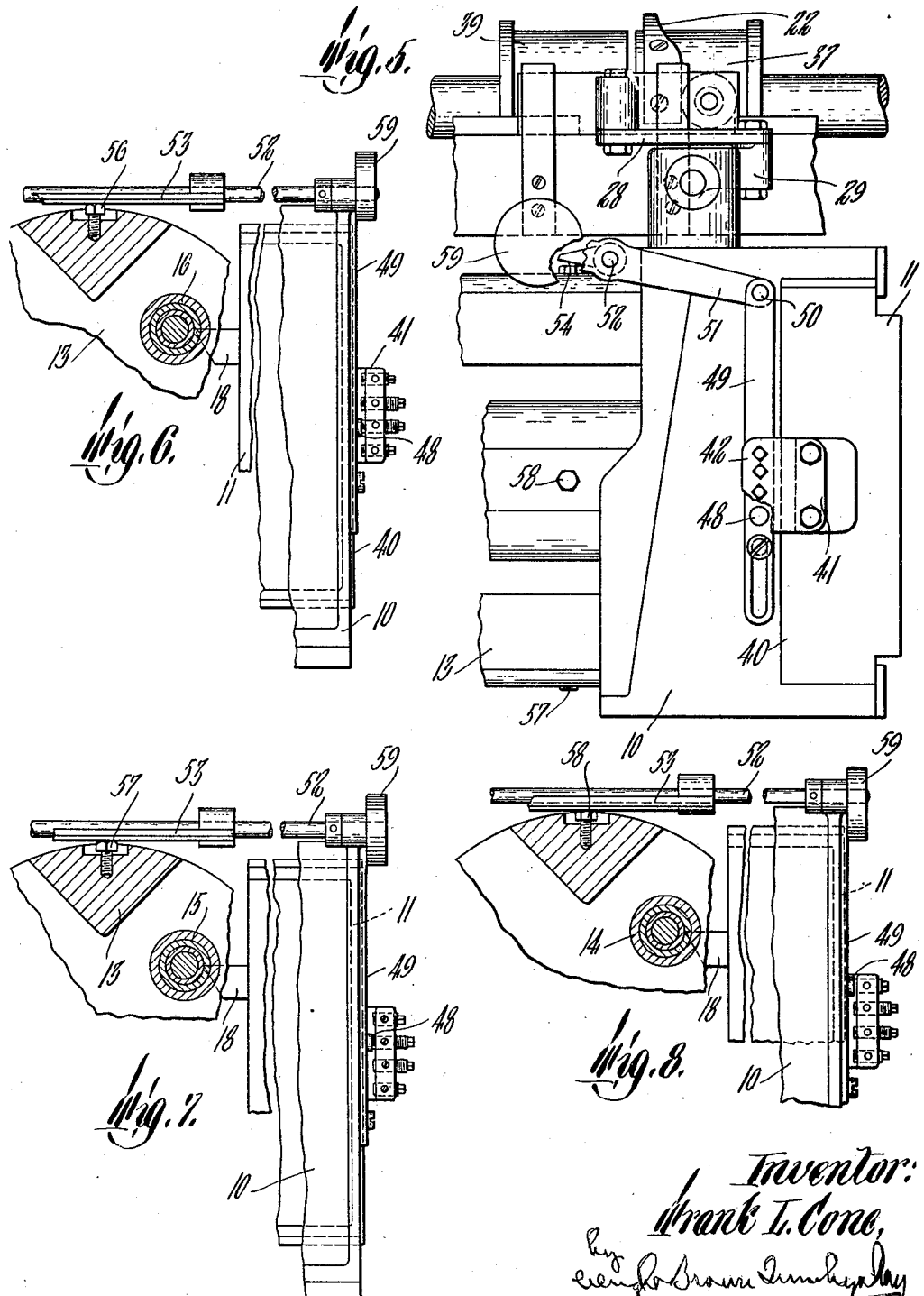

Patented June 4, 1929.

1,716,303

UNITED STATES PATENT OFFICE.

FRANK L. CONE, OF WINDSOR, VERMONT.

TOOL STOP FOR AUTOMATIC SCREW MACHINES.

Application filed October 9, 1926. Serial No. 140,484.

This invention relates to metal-working machines and more particularly to multiple-spindle automatic screw machines, such for example as that described in my Patent No. 1,271,540 issued July 9, 1918. In machines of this type, the work-carrying spindles are usually mounted in a turret which is intermittently rotated to present the work successively to different tools which are moved into cutting relation when the turret is at rest. As described in my above mentioned patent, certain of the tools may be made to approach the work from the side and may for this purpose be mounted on slides actuable by suitable cams and connections. Each actuation of a tool slide toward the work in an automatic machine moves each tool carried by the slide to a definite position relative to the axis of the turret. If the spindles carried by the turret are so located that their axes are accurately symmetrical with respect to the axis of the turret, then the tools will operate in an identical manner on work carried by any one of the spindles positioned in the corresponding station. In practice, however, it is difficult to attain or to maintain such perfect symmetry. It is therefore obvious that a slight inequality of distances of the spindle axes from the turret axis would mean similar inequalities in the spacing of a tool in its extreme cutting position from the axes of the different spindles reaching the station corresponding to the tool. Hence these inequalities would appear also in the diameters of the finished work since a tool would not cut as near to the axis of the work on one spindle as it would on another if the spindles were not accurately symmetrically placed with respect to the axis of the turret. As it is usually of paramount importance that the product of a machine of this type be uniform in dimensions, I have devised means to compensate for slight errors in the arrangement of the spindles and thus to enable a machine having such a turret to turn out a uniform product. Briefly, this means comprises a positive stop to limit the cutting motion of the tool, this limit being separately adjustable to correspond to each position of the turret. For a complete disclosure of my invention, reference may be had to the description which follows and to the drawings, of which:—

Figure 1 is a transverse sectional view of an automatic screw machine showing an embodiment of my invention as applied thereto.

Figure 2 is a perspective of an abutment plate for a tool slide.

Figure 3 is a section on the line 3—3 of Figure 2.

Figure 4 is a perspective of part of the mechanism for controlling the location of the tool-slide stop.

Figure 5 is a side elevation of a portion of the screw machine.

Figures 6, 7 and 8 are fragmentary views showing the stop in various positions.

Referring to the drawings in detail, 10 represents a portion of the framework of an automatic screw machine which may be similar to that described in my Patent No. 1,271,540. This portion extends transversely of the machine and slidably supports a pair of tool carriages 11, 12, which are mounted on either side of the turret 13 and are adapted to be moved toward or from the work which is supported by spindles carried by the turret and generally indicated as 14, 15, 16, 17. In the form of machine illustrated in the drawing, each tool carriage carries two tools, the carriage 11 having tools 18 and 19, carriage 12 having tools 20 and 21. These tools are conventionally indicated and may be of any desired kind suitable for the particular work being done on the machine. As shown in Figure 1, the rotation of the turret to place the work-carrying spindles in successive positions for operation by the different tools is clockwise. Thus for example, fresh stock may be introduced through the spindle at the station occupied in Figure 1 by spindle 17 and the initial rough cutting thereon may be performed by tool 18. The turret is then rotated so that the spindle now occupies the station formerly occupied by the spindle 14. Here the work may be accurately cut by the tool 19. The work is then advanced to a third station where it may be accurately cut by the tool 20, and finally to a fourth station where it is cut off by the tool 21. After the cutting-off operation, the stock is fed forwardly through the spindle by the desired amount in time to be presented for the initial operation by the tool 18 when the spindle again reaches the first station indicated in Figure 1 by the spindle 17. This cycle of operations is merely illustrative and may be varied according to the requirements of the desired product. For example, if the desired product requires but one shaping operation, fresh stock may be supplied at stations 1 and 3 for the shaping operation by the tools 18 and 20, the cutting off of the finished product being performed by the tools 19 and 21 respectively. It will be noted that the arrangement of two tools on each carriage permits the adjustment of the carriage stop for either one of the tools, but not for both. This makes for simplicity of design and economy of construction compared with that required for separate stops for each one of the tools, and does not diminish the practical utility of the machine since fine precision of cutting is not needed for roughing cuts nor for cutting finished work from the stock. The means for rotating the spindle-carrying turret 13 and locking it successively in such positions as to locate the spindles in the stations as shown, is fully described in my patent aforementioned. The operation of the tool slides is effected through suitable cams which as shown are mounted on drums above the turret. The tool carriage 11 is operably connected to a cam 22 by a cam follower 23 which may comprise a roller mounted upon a suitable slide 24 which slides longitudinally of the machine on a frame member 25 and is held in place thereon as by a suitable number of upstanding guides 26 fixed to the frame member 25. A lug 27 formed on the slide 24 is pivotally connected with a suitable link 28 which in turn is similarly connected to the end of an arm 29 formed on a rock shaft 30. On the rock shaft 30 is formed a pair of lugs 31, 32, which are pivotally connected with suitable tension members 33, 34 adjustably secured to the tool carriage 11 as by nuts 35, 36. The cam 22 is mounted on the periphery of a suitable drum 37 which may be keyed to a shaft 38 extending longitudinally of the machine and adapted to be rotated automatically by suitable means not shown herein, but fully set forth in my aforementioned patent. Rotation of the shaft 38 with the drum 37 and the cam 22 in a counter-clockwise direction (Figure 1) will cause the cam follower 23 to ride on the edge of the cam 22 and to be displaced longitudinally of the machine. The motion of the cam follower 23 and the slide 24 is communicated to the rock shaft 30 through the link 28 and the arm 29. The rocking of the shaft 30 will cause the tool carriage 11 to approach the turret, and the tools to approach the spindles in the stations corresponding thereto. On the side of the cam-carrying drum 37, opposite to the cam member 22, is mounted a second cam (not shown) which is adapted to cause the cam follower 23 to move in the opposite direction and thus to retract the tool carriage 11 from the turret. The tool carriage 12 is likewise operated by mechanism which is similar to that described for the operation of the tool carriage 11 and therefore will not be described in detail. A second cam-carrying drum 39 is mounted on the shaft 38 and carries suitable cams for the operation of the tool carriage 12.

By carefully adjusting the position of the cam 22 and the other cams carried by the drums 37, 39, the throw or motion of the tool carriages 11, 12 can be regulated. On account of the elasticity of the members connecting the cam with the tool carriage, it is practically impossible to secure the necessary fineness of adjustment of the extreme cutting position of the tool without providing a positive stop to limit the inward motion of each tool carriage toward the turret. In a massively built machine, the elasticity of the connecting members is slight but sufficient to make such a positive stop for the tool carriage necessary where a relatively high degree of accuracy is demanded in the finished product. Such a stop definitely regulates the exact location of the cutting edge of each tool carried by the tool carriage with reference to the axis of the turret since this axis is definitely located with respect to the main frame of the machine. If the axes of the several spindles and the work carried thereby were accurately and symmetrically arranged with respect to the axis of the turret, each tool would operate similarly on the work in the successive spindles reaching the station corresponding to the tool. It is found as a practical matter, however, that on account of slight inaccuracies in construction or eccentricities due to the wearing of parts, the axes of the work in the several spindles may vary slightly in their respective distances from the axis of the turret. These inequalities of distance will be reflected in similar inequalities in the diameters of the finished work carried by the several spindles, unless provision is made to compensate for such inequalities. By my invention, I provide means for separately adjusting the limiting position of each tool carriage according to the particular spindle which is occupying a given station when the tool carriage is advanced toward the turret. As this limiting means is, as shown, identical for both carriages 11 and 12, I will describe such means as applied to the carriage 11 only. Upon a vertical member 40 of the carriage 11, I mount an abutment plate 41 which is provided with a portion 42 extending over the edge of the upright member 40. The projecting portion 42 is so arranged as to approach a portion of the main frame 10 of the machine as the carriage 11 moves toward the turret 13. Threaded through the projecting portion 42 I provide a vertically extending series of screw threaded abutment members 43, 44, 45, 46, there being one for each spindle carried by the turret. Each of these abutment members is capable of adjustment toward or away from the frame 10 of the machine and is held in adjusted position as by a set screw 47. Between the extension 42 and the frame 10 I provide a stop member or lug 48 which is adapted to be positioned selectively between the frame 10 and any one of the abutment members 43, 44, 45 or 46. The engagement of any one of these abutment members against the lug 48 which is backed up by the frame 10 results in a positive stopping of the tool carriage 11 in a definite position which may be accurately controlled by the adjustment of the individual abutment members. As will be described, the lug 48 is positioned between the frame and the abutment member corresponding to the spindle which is at a given station when the tool carriage 11 approaches the turret. Thus for example when the spindle 14 is at the station corresponding to the tool 19 (as shown in Figure 1), the lug 48 will be opposite the abutment member 46. When the turret is turned so as to position the spindle 17 opposite the tool 19, the lug 48 will be positioned opposite the abutment member 45. In like manner when the spindles 16 and 15 successively become opposite the tool 19, the lug 48 will be respectively opposite the members 44 and 43, so that by the separate adjustment of the abutment members 43, 44, 45, 46, the extreme cutting position of the tool 19 may be adjusted to compensate for any individual inequalities of the location of the axes of the various spindles with reference to the axis of the turret and the work turned out on the various spindles may thus be made accurately uniform. In like manner, the approach of the carriage 12 is controlled and adjusted for the several spindles by similar apparatus.

The mechanism illustrated for positioning the lug 48 in line with the various abutment members comprises a vertically sliding member 49 on which the lug 48 is mounted. The slide 49 is pivotally connected as at 50 to a crank arm 51 which is mounted on a rock shaft 52. A rocking arm 53 is also mounted on the shaft 52 and as shown comprises a member extending from the shaft over the turret and provided with a flat face 54 adapted for engagement by suitable projections 55, 56, 57, 58, which are formed on or attached to the periphery of the turret 13. These projections as shown comprise screws which are threaded radially into the periphery of the turret and thus may be radially adjusted. Each of these screws projects at a different characteristic distance from the axis of the turret, the screw 55 as shown projecting the most, while the screw 58 projects the least. As a result the rocking member 53, the face of which is successively engaged by the screw, is adapted to be rocked thereby through different characteristic arcs, this rocking motion being transmitted through the shaft 52 and the crank 51 to the slide 49, thus moving the lug 48 upwardly by different distances which may be so regulated as to position the lug in line with the respective abutment members 43, 44, 45 or 46, by the proper adjustment of the screws 55, 56, 57, 58. A suitable counterweight 59 or equivalent device is supplied to maintain the rocking member 53 against the periphery of the turret until it is rocked upwardly therefrom by engagement with one of the screws 55, 56, 57 or 58.

Having thus described an embodiment of my invention, it should be evident to those skilled in the art that many changes and modifications may be made therein without departing from its spirit or scope as defined by the appended claims.

I claim:—

1. In a multiple-spindle metal-working machine, a spindle-carrying turret adapted to be held in a succession of different positions, a tool carriage adapted to carry two separate tools for simultaneous operation on different pieces of work carried by the several spindles of said turret, means for advancing said carriage toward said turret when the turret is held, and means for definitely stopping such advance at a point independently determinable for each position of the turret.

2. In a metal-working machine, a turret, four work-carrying spindles mounted on said turret, means for holding said turret successively in four different positions, a pair of tool carriages oppositely positioned with respect to said turret, each tool carriage being adapted to carry two separate tools for simultaneous operation on different pieces of work carried by said spindles, means for advancing each carriage toward said turret when the turret is held, and means for independently stopping the advance of each carriage at points independently determinable for each position of the turret.

3. In a multiple-spindle metal-working machine, a turret adapted to be held in any one of a plurality of positions, a tool slide, means for moving the tool slide toward the turret and means for limiting the motion of said carriage toward the turret, said limiting means comprising a plurality of individually adjustable abutment members mounted on said carriage, there being one abutment member for each position of the turret, and a stop member selectively interposable in the path of any one of the abutment members according to the position of the turret.

4. A multiple-spindle metal-working machine having a main frame, a spindle-carrying turret, a tool carriage, means for holding said turret in any of a plurality of positions, and means for advancing said carriage toward said turret when so held, in combination with means for limiting the advance of said carriage, said limiting means comprising abutment members mounted on said carriage, and a stop member interposable successively between each of said abutment members and a portion of said frame in accordance with the angular position of the turret.

5. A multiple-spindle metal-working machine having a main frame, a spindle-carrying turret, a tool carriage, means for holding said turret in any of a plurality of positions and means for advancing said carriage toward said turret when so held, in combination with means for limiting the advance of said carriage, said limiting means comprising abutment members mounted on said carriage, one for each position of said turret, a stop member interposable successively between each of said abutment members and a portion of said frame in accordance with the angular position of the turret, and means carried by the turret for controlling the position of the stop member.

6. In a multiple-spindle metal-working machine, a turret, a plurality of spindles arranged about the axis of the turret and substantially equally spaced from the axis thereof, said turret being adapted to rotate to different positions to move the spindles into successive stations, a plurality of tool carriages, each carriage being adapted to carry a plurality of tools for simultaneous operation on different pieces of work carried by said spindles, means for moving said carriages toward adjacent stations, and means for regulating the motion of each said carriage to limit its approach toward a station to a constant distance from the axis of the spindle therein regardless of slight inequalities of distance of said spindles from the axis of the turret.

7. In an automatic screw machine, a frame, a turret adapted to be alternately rotated and stopped in successive positions, a plurality of spindles carried by said turret and adapted to occupy successive stations as the turret is stopped in its different positions, a tool carriage mounted to slide on said frame toward and away from said turret, and means for definitely limiting the motion of the carriage towards the turret, said limiting means comprising a plurality of abutment members carried by said carriage and adjustable relatively thereto in the direction of motion of the carriage, a movable stop member successively interposable between said frame and each of said abutment members, and means for moving said stop member into the path of successive abutment members according to the position of said turret.

8. In an automatic screw machine, a frame, a turret mounted in said frame and adapted to be rotated into a succession of definite positions, projections extending radially from said turret and spaced about the periphery thereof and corresponding respectively to said successive positions of said turret, said projections each extending a characteristic distance from the axis of the turret, a rockable arm adapted to be engaged and rocked successively by said projections, a slide operatively connected with said arm, a stop member carried by said slide and movable therewith when said arm is rocked, a tool carriage mounted in said frame, means for moving said carriage toward and away from said turret, and abutment elements corresponding to said projections adjustably mounted on said carriage and movable toward a stationary portion of said frame, the arrangement being such that the rocking of said arm by contact with one of said projections will move said stop member between the corresponding abutment member and the frame, thus limiting the motion of the abutment member and the carriage.

9. In a multiple-spindle metal working machine, a spindle carrying turret adapted to be held in a succession of different positions, a tool carriage adapted to carry a tool for operation on work carried by one of said spindles, means for advancing said carriage toward said turret, and means for stopping said advance at independently determinable points corresponding to the various positions of said turret, said stopping means including a member independent of said turret for taking the thrust of said carriage advancing means when the carriage reaches one of said stopping points.

In testimony whereof I have affixed my signature.

FRANK L. CONE.